Aug. 8, 1950 D. E. SUNSTEIN ET AL 2,518,092

ULTRA HIGH FREQUENCY BAND-PASS CIRCUITS

Filed July 24, 1945 2 Sheets-Sheet 1

INVENTOR.
DAVID E. SUNSTEIN
NELS JOHNSON
BY
Ostrolenk + Faber
ATTORNEYS

ULTRA HIGH FREQUENCY BAND-PASS CIRCUITS
Filed July 24, 1945 2 Sheets-Sheet 2
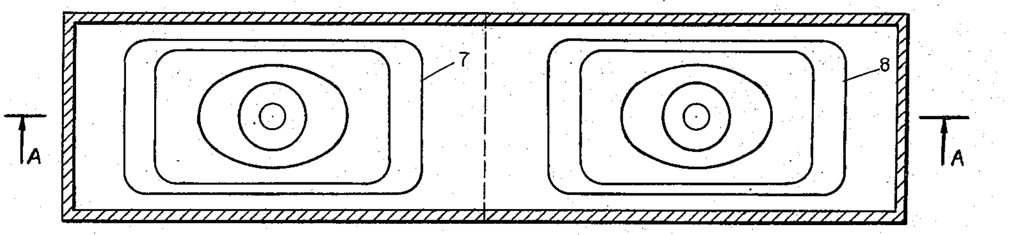
FIG. 5
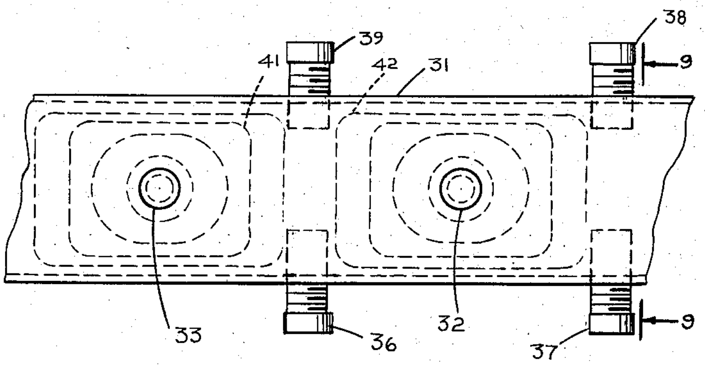
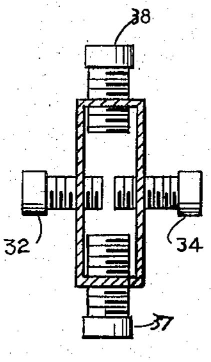
FIG. 8 FIG. 9
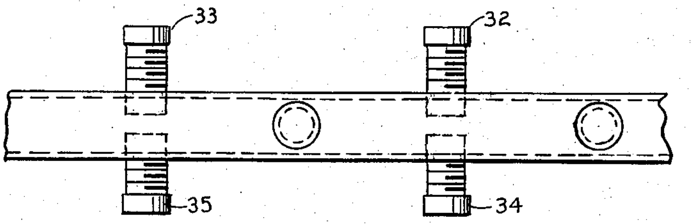
FIG. 7
FIG. 6
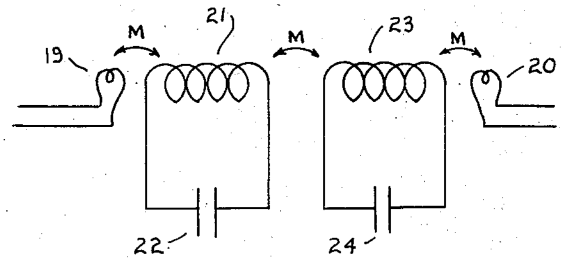
INVENTOR.
DAVID E. SUNSTEIN
NELS JOHNSON
BY
Ostrolenk & Faber
ATTORNEYS Patented Aug. 8, 1950 2,518,092

UNITED STATES PATENT OFFICE 2,518,092

ULTRA HIGH FREQUENCY BAND-PASS CIRCUITS

David E. Sunstein, Elkins Park, and Nels Johnson, Lower Merion Township, Montgomery County, Pa., assignors, by mesne assignments, to Philco Corporation, Philadelphia, Pa., a corporation of Pennsylvania Application July 24, 1945, Serial No. 606,774

1 Claim. (Cl. 178—44)

Our invention relates to transmission systems for high frequency electrical signals, and, more particularly, to a novel wave guide system for transmission of such signals within a predetermined frequency band width.

In radio frequency transmissions, band pass filters are often required in order to pass a fixed band of frequencies and exclude other frequency bands outside the fixed band. In the field of micro wave transmissions, such band pass filters have heretofore been complicated and involved.

In such ultra-high frequency signal systems, resonance is usually established by hollow metal cavity resonators suitably coupled to the high frequency generating systems. These cavity resonators act in a manner comparable to the tuned tank circuits utilized at the lower frequencies. The resonant frequency of a cavity is, in general, fixed and a function of the resonator geometry and the coupling system utilized.

We have discovered that if a cavity resonator or wave guide has its configuration altered along one of its dimensions, waves of greater or shorter length, depending upon the configuration change, are permitted to propagate down the wave guide, and by a further change in the configuration along another dimension, a variation of the mutual coupling between the tuned elements of the wave guide, is achieved.

Accordingly, an object of the invention is to provide a novel band pass filter for micro waves.

A further object of the invention is to provide a novel band pass filter in which the mid-frequency of the pass band and the band width of the filter can be independently adjusted or controlled in design.

Still another object of the invention is to provide a novel wave guide functioning as a band pass filter.

In general, in carrying out the invention to provide filtering action in wave guide propagation, we insert in the wave guide at chosen intervals, discontinuities which may be in the form of adjusting screws. These discontinuities or adjusting screws will be described in what follows, in association with a rectangular wave guide operating in a mode analogous to what is known as the $TE_{01}$ mode. In this rectangular wave guide, in the broad face thereof, adjusting screws are placed approximately a half guide wave length apart (wave length measured with the screws in place), and so arranged as to be screwed into the opening inside of the wave guide. The position of these screws controls the center frequency of the pass band.

Likewise, we place in the narrow side of the guide and spaced along the guide half-way in between the other sets of screws, a further set of screws. These screws serve the purpose of varying the coupling between sections of the guide, and, consequently, make it possible to adjust the band width of the filter.

Electrically, and for ease of understanding the invention, a system may be regarded as analogous to a series of tuned circuits magnetically coupled to one another, which, as is well known, exhibit band pass filter properties.

The invention, then, comprises a novel wave guide so constructed that it acts as a band pass filter, and more particularly the frequency which is passed will lie below the cut-off frequency for the normal wave guide action to take place. This band pass filter is completely shielded, and the resonant frequency or mid-frequency of the pass band, as well as the band width, can be adjusted or fixed by design, independently of one another. The details of the invention will now be described with respect to the drawings, in which:

Figures 4 and 5 illustrate two such resonant cavities magnetically coupled;

Figure 6 is a circuit equivalent to the structure of Figure 4;

Figures 7, 8 and 9 show a continuation or extension of the diagram of Figure 4.

Figure 1:
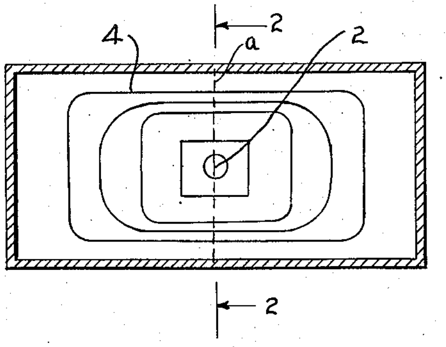
Figure 1 shows a single resonant cavity with certain reentranticities.
Figure 2:
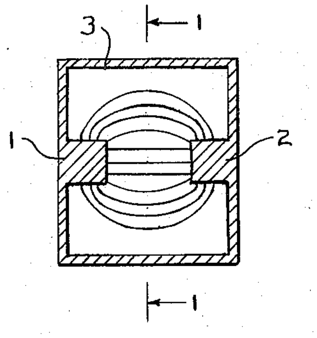
Figure 2 shows a cross-section through line 2—2 of Figure 1.

Referring to Figures 1 and 2, an electromagnetic resonant cavity 3 of rectangular cross-section is shown provided with two points of reentranticity. These are composed of posts or bumps 1 and 2 which are located in larger-dimensioned side walls on the inside of the cavity (at the center of the cavity). The precise location in the plan view of Figure 1 is shown by the dotted line *a*.

Lines of the electrode field 3 in this cavity arrange themselves across the narrow dimension between these two bumps, and lines of the magnetic field 4 in this cavity arrange themselves circularly around the lines of the electric field. Well known mathematical equations will provide the resonant frequency of such a cavity of predetermined dimensions. As shown by these equations, the resonant frequency of this cavity will be lower than the resonant frequency of a cavity of similar dimension without the bumps 1 and 2.

Figure 3:
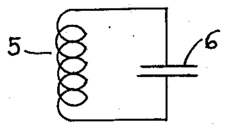
Figure 3 shows an analogous tuned circuit.
Figure 4:
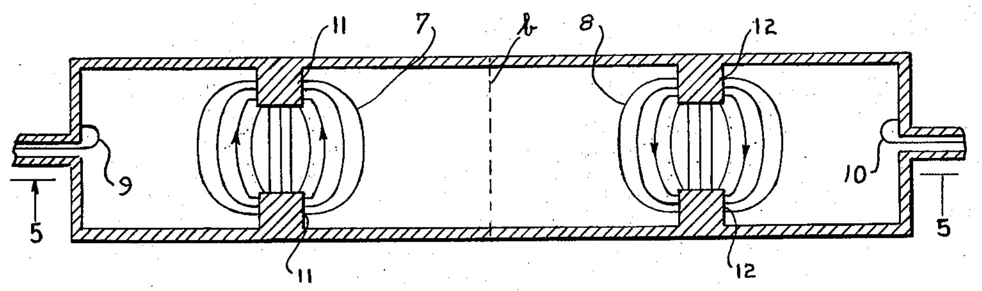

This cavity being in effect then a resonant element, will have the equivalent circuit shown in Figure 3, consisting of an inductance 5 and capacitor 6. If two of the cavities shown in Figure 1 are placed side by side and are arranged to have the same resonant frequency, they can be coupled together through an opening in the common wall of the two cavities. This arrangement is shown in Figure 4 in which the common wall which has been removed is indicated by the dotted line *b*. Observation of the direction of electric field lines 7 and 8 shows that coupling between these two halves of the resonant systems is obtained magnetically, as by magnetic lines corresponding to 4 of Figure 1, but omitted in Figure 4 for clarity.

To be more specific, coupling to the resonant cavity on the left may be obtained through the magnetic field by the insertion of a small loop 9 in the left-hand end of the cavity. Energy is extracted from the system through a small loop 10 in the right-hand end of the right-hand cavity. Since the lines of the magnetic field are the only lines which become parallel to each other and in the same sense at the junction between the two resonant sections, the two sections are magnetically coupled.

The equivalent circuit of this system is shown in Figure 6, in which inductance loop 9 corresponds to coil 19; output loop 10 is represented by coil 20; the resonant inductance and capacitance of the left-hand resonant element correspond to coil 21 and capacitor 22; and the resonant properties of the right-hand half of Figure 4 are represented by coil 23 and condenser 24. Inspection of the circuit of Figure 6 and analysis of it by well-known electrical techniques show that this circuit has certain band-pass properties in the electrical frequency spectrum, i. e., it will pass certain frequencies and will reject other frequencies. The frequencies which it passes comprise a band of frequencies about a center frequency which is approximately the resonant frequency of the two elements in question, i. e., the resonant frequency of coil 21 and capacitor 22, which may be the same as the resonant frequency of coil 23 and capacitor 24.

It will now be clear that in order that the wave guide of Figure 4 exhibit band pass filtering, the requirements are that the center frequency of the band pass shall be at or near the resonant frequency of the two resonant sections. Adjustment to secure such resonance is obtained in the arrangement of Figure 4 by adjusting the depth to which the protuberances 11 and 12 project inside the cavities. Tuning of the center frequency is obtained by the simultaneous adjustment of either two or four projections into the cavities of Figure 4. These projections are conveniently made with driving elements or screws shown in Figures 7, 8 and 9, which are rotated to vary their projection into the cavity.

Referring to Figure 6, the electrical quantity which controls the band width of this filter, is the mutual coupling between the two resonant sections. This mutual coupling is obtained in the construction of Figure 4 in the area over which the magnetic lines of the two sections come into contact with each other; and may be controlled or varied for any given spacing between the centers of the two resonant cavities, by opening or closing the hole in a membrane which is placed at the location of the dotted line *b* in Figure 4.

A specific construction for varying the coupling between the two elements is shown in Figures 7 to 9. As shown, the wave guide section 31, which may be of considerable length, is provided with protuberances for tuning the mid-frequency at 32, 33, 34 and 35. Screws 32 and 34 extending through the long dimension of the rectangular wave guide are spaced approximately one half guide wave length from the screws 33 and 35, the first set of these screws being approximately one quarter guide wave length from the end of the wave guide. Magnetic lines 41 and 42 are in parallel relation with respect to each other in the region between a further set of adjusting screws 36 and 39, and flow half-way between screws 32 and 33, and 35 and 34. At the position along the narrow meeting, screws 36 and 39 are projected into the wave guide. They affect the magnetic field so that the coupling between magnetic lines 41 and 42 decreases as these screws are advanced into the wave guide. Consequently, the band width of the filter becomes correspondingly smaller. Since the magnetic field as indicated by the dotted lines in these figures is relatively weak at these last-mentioned plugs 36 and 39, these plugs may be varied to vary the coupling between the various elements of the wave guide without materially affecting the central tuning of the guide.

Figure 10:
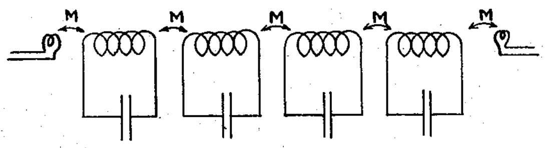
Figure 10 shows an equivalent circuit of Figure 4.

If, as is indicated in Figure 7, the filter consists of a succession of elements with electric field discontinuities such as frequency tuning screws 32 and 34 projecting into the guide from the wide face of the guide, and with magnetic field discontinuities such as band width adjusting screws 36 and 39 projecting in from the narrow face of the guide, an equivalent circuit such as that shown in Figure 10 is achieved.

Here each resonant element of the section of wave guide is again represented by an LC combination, and the couplings between each successive resonant element are indicated by the mutual inductance couplings between the elements.

Such a circuit can be analyzed by the standard methods of alternating current circuit analysis and again it is shown that such a circuit can be arranged to act as a satisfactory band pass filter. Furthermore, in the arrangement of the wave guide which we have described, particularly in association with Figure 7, it is seen that there is a direct association between the variations of the projecting screws in Figure 7 with the resonant frequencies of the individual elements of Figure 10. Likewise, the depth of penetration into the guide of screws such as 36 and 39 has a definite relation to the mutual coupling between the resonant elements of Figure 10.

Consequently, by adjusting these two sets of screws by any well known mechanism which would adjust all the screws of one set simultaneously, it is possible to achieve a system in which the resonant frequency is varied over a desired range by adjusting the set of screws such as 32 and 33, and in which the band width characteristics of the filter can be altered by adjusting a set of screws such as 36 and 39, again simultaneously. Coupling into such a wave guide at the two ends may be arranged as is shown in Figure 4, again with loop coupling at the two ends of the guide.

Such a system might well be used as a band pass filter in a micro-wave superheterodyne receiver, such a tuner being used in the radio frequency stages.

In the above we have illustrated just one example of a possible use of this invention. Many others will occur to the engineer who is engaged in the construction of such devices.

Our invention then provides a band pass filter to be used with micro-wave frequency. This band pass filter has the unique property of having one set of adjustments which will control the central frequency, and another set of adjustments which will control the band width which is passed by the filter.

We have described our invention with respect to certain specific arrangements. We prefer, however, that our invention be more fully described in terms of the following claim.

We claim:

In a system for providing filtering action in a wave guide propagation, a wave guide of rectangular cross-section, adjusting screws inserted in the broad side of said wave guide, spaced apart in the broad side of the wave guide approximately a half wave length, the positions of said screws controlling the central frequency of said wave guide propagation, and adjusting screws inserted in the narrow side of the wave guide along the guide and half-way between the first-mentioned adjusting screws, for varying the coupling between the successive sections of said guide for adjusting the band width of the filter, the diameter of said last mentioned screws being substantially equal in dimension to the dimension of said narrow side of said wave guide.

DAVID E. SUNSTEIN.
NELS JOHNSON.

REFERENCES CITED

The following references are of record in the file of this patent:

UNITED STATES PATENTS

| Number | Name | Date |
|---|---|---|
| 2,155,508 | Schelkunoff | Apr. 25, 1939 |
| 2,253,589 | Southworth | Aug. 26, 1941 |
| 2,401,489 | Lindenblad | June 4, 1946 |
| 2,406,402 | Ring | Aug. 27, 1946 |
| 2,432,093 | Fox | Dec. 9, 1947 |